United States Patent
Tsunoda et al.

(10) Patent No.: US 11,410,055 B2
(45) Date of Patent: Aug. 9, 2022

(54) LEARNING OF A FEATURE BASED ON BETTI SEQUENCES OBTAINED FROM TIME SERIES DATA

(71) Applicant: FUJITSU LIMITED, Kawasaki (JP)

(72) Inventors: Tomoyuki Tsunoda, Kawasaki (JP); Yoshiaki Ikai, Fujisawa (JP); Junji Kaneko, Mishima (JP); Takahiro Saito, Asaka (JP)

(73) Assignee: FUJITSU LIMITED, Kawasaki (JP)

( * ) Notice: Subject to any disclaimer, the term of this patent is extended or adjusted under 35 U.S.C. 154(b) by 477 days.

(21) Appl. No.: 16/687,925

(22) Filed: Nov. 19, 2019

(65) Prior Publication Data
US 2020/0184353 A1 Jun. 11, 2020

(30) Foreign Application Priority Data
Dec. 6, 2018 (JP) .............................. JP2018-229455

(51) Int. Cl.
*G06N 20/00* (2019.01)
*G06N 5/04* (2006.01)
*G06F 16/28* (2019.01)

(52) U.S. Cl.
CPC ............. *G06N 5/04* (2013.01); *G06F 16/285* (2019.01); *G06N 20/00* (2019.01)

(58) Field of Classification Search
None
See application file for complete search history.

(56) References Cited

U.S. PATENT DOCUMENTS

| 2017/0147946 A1* | 5/2017 | Umeda | G06N 5/046 |
| 2018/0204324 A1* | 7/2018 | Kawaguchi | G01N 21/84 |
| 2018/0260519 A1* | 9/2018 | Rietman | G06F 17/11 |

FOREIGN PATENT DOCUMENTS

| JP | 11-142425 | 5/1999 |
| JP | 2017-097643 | 6/2017 |
| JP | 2018-092349 | 6/2018 |
| WO | 2006/137142 A1 | 12/2006 |

* cited by examiner

*Primary Examiner* — Cai Y Chen
(74) *Attorney, Agent, or Firm* — Fujitsu Patent Center

(57) ABSTRACT

An apparatus obtains time series data to which a label indicating a category of classification is attached, where the time series data contains variations of target values during a period to which the label is attached. The apparatus divides the time series data into a plurality of sections, and generates an attractor for each of the plurality of sections where the attractor indicates a set of numerical values toward which the variations of the target values tends to evolve. The apparatus calculates a Betti sequence in accordance with the generated attractor for each of the plurality of sections, and obtains a feature for the Betti sequences of the plurality of sections by clustering the Betti sequences or by calculating a statistical quantity of the Betti sequences. The apparatus performs machine learning by using the obtained feature as an input.

7 Claims, 18 Drawing Sheets

| TIME | LABEL | DATA |
|---|---|---|
| 10:00~10:10 | LABEL A | TIME SERIES DATA PER UNIT TIME |
| 10:10~10:20 | LABEL A | TIME SERIES DATA PER UNIT TIME |
| 10:20~10:30 | LABEL B | TIME SERIES DATA PER UNIT TIME |
| 10:30~10:40 | LABEL C | TIME SERIES DATA PER UNIT TIME |

FIG. 5

| TIME | LABEL | SUB-SECTION NUMBER | DATA |
|---|---|---|---|
| 10:00-10:10 | LABEL A | 1 | TIME SERIES DATA PER SUB-SECTION |
| | | 2 | TIME SERIES DATA PER SUB-SECTION |
| | | 3 | TIME SERIES DATA PER SUB-SECTION |
| | | ... | |
| 10:10-10:20 | LABEL A | 1 | TIME SERIES DATA PER SUB-SECTION |
| ... | | | |

FIG. 6

| TIME | LABEL | SUB-SECTION NUMBER | DATA |
|---|---|---|---|
| 10:00-10:10 | LABEL A | 1 | BETTI SEQUENCE |
| | | 2 | BETTI SEQUENCE |
| | | 3 | BETTI SEQUENCE |
| | | ... | |
| 10:10-10:20 | LABEL A | 1 | BETTI SEQUENCE |
| ... | | | |

| TIME | LABEL | DATA |
|---|---|---|
| 10:00-10:10 | LABEL A | FEATURE VECTOR (THE NUMBERS FOR RESPECTIVE CLUSTERS) |
| 10:10-10:20 | LABEL A | FEATURE VECTOR (THE NUMBERS FOR RESPECTIVE CLUSTERS) |
| 10:20-10:30 | LABEL B | FEATURE VECTOR (THE NUMBERS FOR RESPECTIVE CLUSTERS) |
| 10:30-10:40 | LABEL C | FEATURE VECTOR (THE NUMBERS FOR RESPECTIVE CLUSTERS) |

RADIUS: 0

RADIUS: $r_1$

RADIUS: $r_2$

RADIUS: $r_3$

FIG. 18
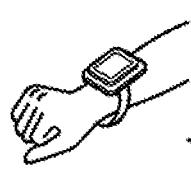
OPERATOR A
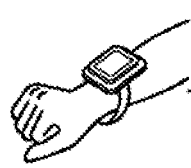
OPERATOR B
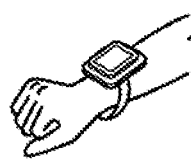
OPERATOR C
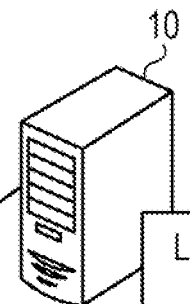
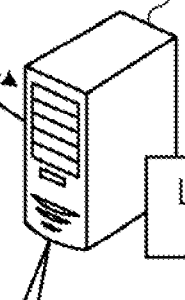

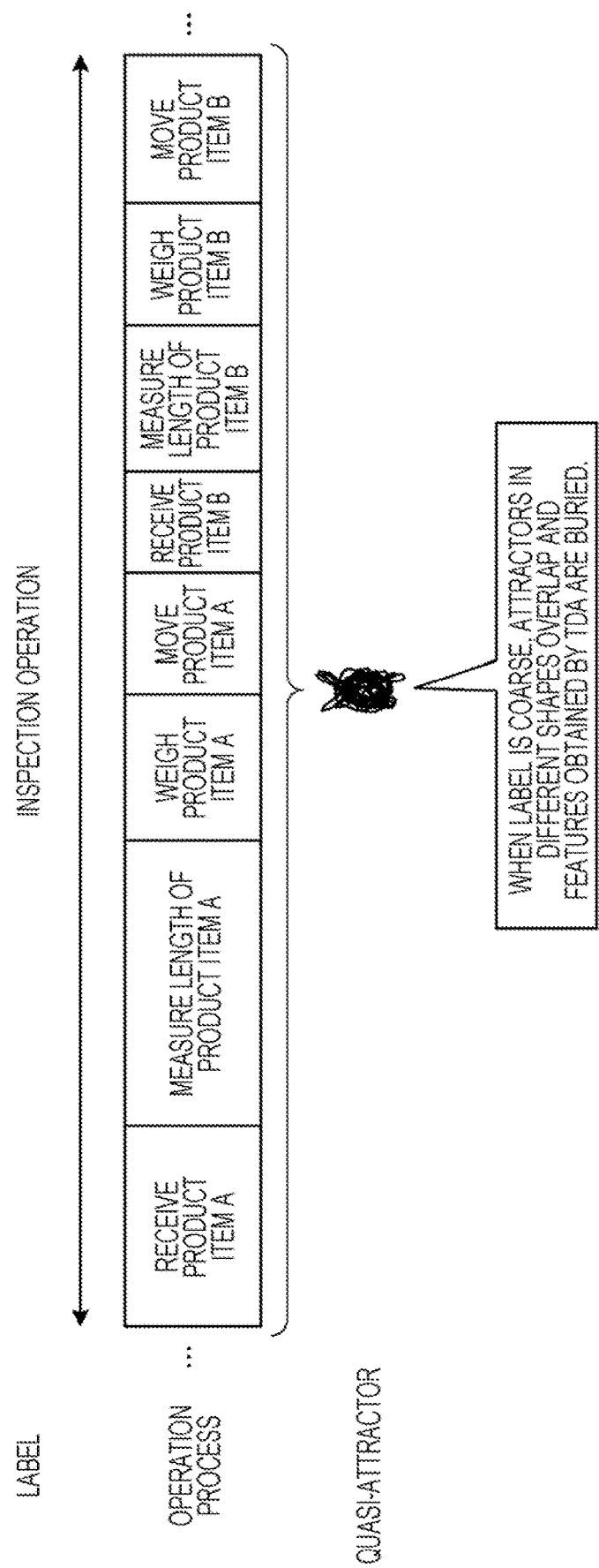

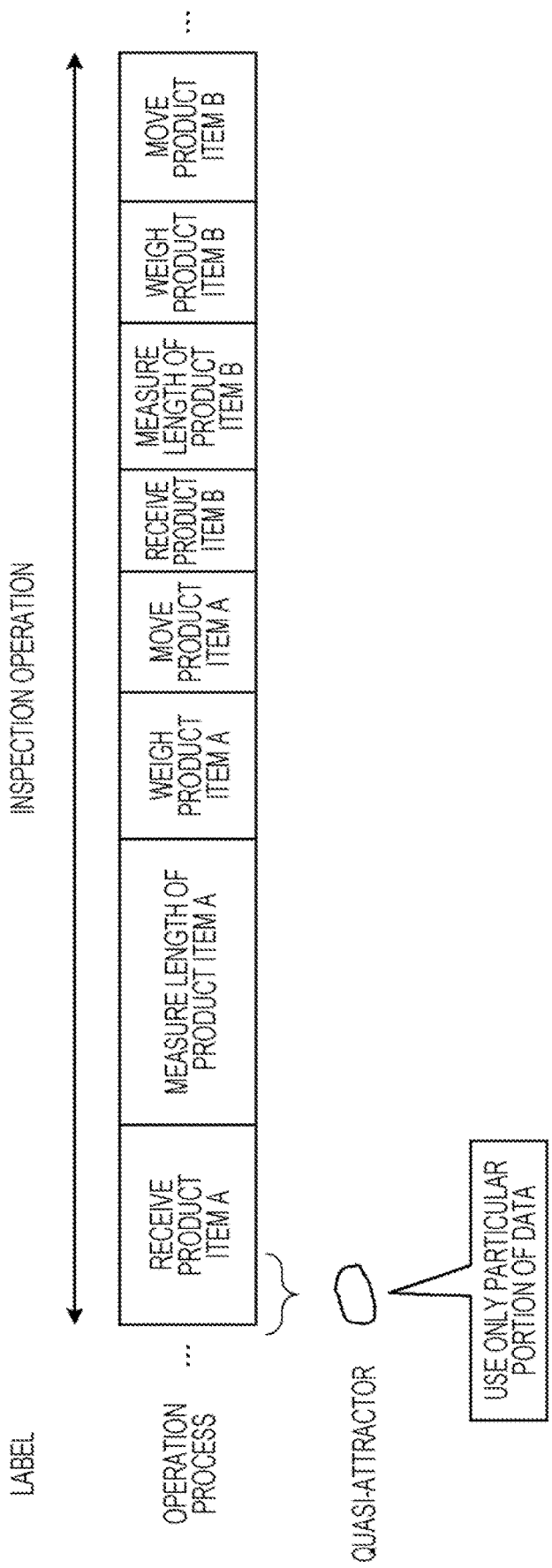

LEARNING OF A FEATURE BASED ON BETTI SEQUENCES OBTAINED FROM TIME SERIES DATA

CROSS-REFERENCE TO RELATED APPLICATION

This application is based upon and claims the benefit of priority of the prior Japanese Patent Application No. 2018-229455, filed on Dec. 6, 2018, the entire contents of which are incorporated herein by reference.

FIELD

The embodiments discussed herein are related to learning of a feature based on Betti sequences obtained from time series data.

BACKGROUND

An analysis method using topological data analysis (TDA) is known as a technology for detecting changes corresponding to anomaly in data by analyzing time series data. For example, time series data is input and sectioned into subsets, the subsets of time series data are in turn converted into quasi-attractors that are a finite number of attractors, and Betti numbers are computed in accordance with the quasi-attractors by performing persistent homology conversion (PH conversion). Here, an attractor is a set of numerical values toward which a system tends to evolve. "Homology" is a method of expressing features of an object by using the numbers of holes in m (m≥0) dimensions. The "hole" mentioned here is an element of a homology group. For example, a zero-dimensional hole is a coupled component, a one-dimensional hole is a hole (a tunnel), and a two-dimensional hole is a void. The number of holes in each dimension is referred to as a Betti number. "Persistent homology" is a method for characterizing transitions of holes in m dimensions with respect to an object (a set of points (a point cloud) in this description) and enables defining features of the positions of points.

A Betti sequence is a sequence of Betti numbers, and by using Betti sequences as a feature vector, machine learning is performed and a learning model is created. By using the trained learning model, anomaly in time series data is detected. This method is suitable to extract features of small movements in data. For example, concerning the case of walking, running, or the like, it is possible to extract a feature by creating attractors with respect to a time unit corresponding to one step to several steps.

Examples of related art include International Publication Pamphlet No. WO 2006/137142, and Japanese Laid-open Patent Publication Nos. 11-142425, 2018-92349, and 2017-97643.

SUMMARY

According to an aspect of the embodiments, an apparatus obtains time series data to which a label indicating a category of classification is attached, where the time series data contains variations of target values during a period to which the label is attached. The apparatus divides the time series data into a plurality of sections, and generates an attractor for each of the plurality of sections where the attractor indicates a set of numerical values toward which the variations of the target values tends to evolve. The apparatus calculates a Betti sequence indicating a sequence of Betti numbers in accordance with the generated attractor for each of the plurality of sections, and obtains a feature for the Betti sequences of the plurality of sections by clustering the Betti sequences or by calculating a statistical quantity of the Betti sequences. The apparatus performs machine learning by using the obtained feature as an input The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of sub-section data;

FIG. 6 illustrates an example of Betti sequences for individual sub-sections;

FIG. 18 illustrates another application example (actual use phase) of the system;

FIG. 20 illustrates an example in which a single label covers a mixture of operations; and FIG. 21 illustrates an example of extracting a feature from a particular portion in a label.

DESCRIPTION OF EMBODIMENTS

Figure 1:
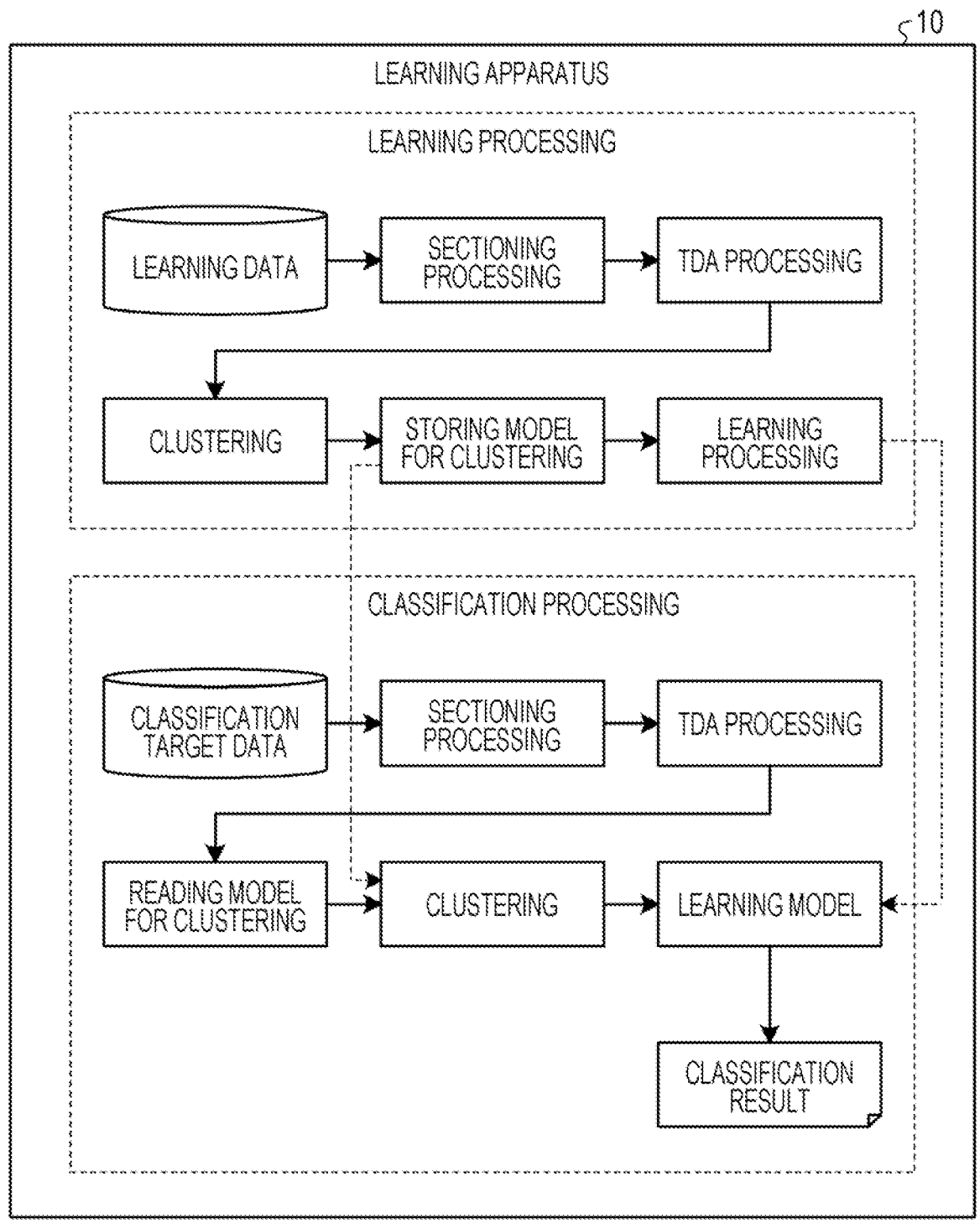
FIG. 1 illustrates a learning apparatus according to an embodiment 1.

In some cases, a single label covers time waveforms representing different features. For example, in the case of classifying processes of operation by personnel, a single label representing a type of operation covers multiple kinds of movements in some cases. For example, a label representing packaging operation may cover operation processes such as assembling a box, packing a product item and a cushioning material, and wrapping. In the case in which a single label covers a mixture of time waveforms representing different features as described above, when an attractor is generated with respect to each unit time of the label, features are buried in other features, and thus, useful Betti sequences are not extracted and the accuracy of learning is decreased.

FIG. 20 illustrates an example in which a single label covers a mixture of operations. FIG. 20 depicts the case in which a single label "inspection operation" covers multiple operation processes such as "receive product item A" and "measure the length of product item A". In this case, since the single label is attached to the multiple operations, a movement pattern of an operator varies under the single label. As a result, when an attractor, or a Betti sequence, is generated by conversion with respect to each unit time of the label, various features caused by the multiple operation processes may be buried in one feature and it is difficult to obtain the valuable features caused by the different operation processes.

Since it is difficult to extract the valuable features because attractors in different shapes overlap as mentioned above, a method of determining a feature of data corresponding to a particular portion in a label as the feature of the label might be considered. FIG. 21 illustrates an example of extracting a feature from a particular portion in a label. As illustrated in FIG. 21, it might be considered to determine the feature of data corresponding to the first few minutes in a label as the feature of the label. However, there is a possibility that the extracted feature of data corresponding to a particular portion is not a representative feature in the label, and thus, this is not a useful method. In addition, sections corresponding to an operation do not coincide with unit times of a label in some cases, and as a result, it is impossible to perform classification in accordance with only data of a particular portion.

It is also considered to attach a different label to each operation process, but this is unrealistic because properly classifying one by one a large number of operation processes and labeling the respective operation processes take excessively long time even when the task is done by an expert.

In one aspect, it is desired to improve the accuracy of data classification.

Hereinafter, embodiments of a learning method, a learning program, and a learning apparatus disclosed in the present application are described in detail with reference to the drawings. It is noted that the embodiments do not limit the present disclosure. The embodiments may be combined with each other as appropriate when there is no contradiction.

Embodiment 1

[Overall Configuration]

FIG. 1 illustrates a learning apparatus 10 according to an embodiment 1. The learning apparatus 10 illustrated in FIG. 1 is an example of a computer apparatus that performs machine learning for analyzing data by using topological data analysis. The learning apparatus 10 converts time series data into a figure referred to as an attractor, extracts a feature of the figure by performing TDA processing, and consequently generates a feature to use as an input for machine learning or the like.

The learning apparatus 10 performs learning processing such as machine learning or deep learning (DL) by using the feature and trains, for example, neural networks (NNs) to properly specify (classify) learning data with respect to individual phenomena.

When input data contains various features in a single label, features of the input data are not properly extracted by performing usual TDA processing in some cases. In this regard, the learning apparatus 10 according to the embodiment 1 sections labeled input data per unit time into a plurality of sub-sections, generates attractors for the individual sub-sections, and computes Betti sequences in accordance with the generated attractors by performing TDA processing. The learning apparatus 10 then performs clustering for the plurality of computed Betti sequences and consequently extracts, as a feature vector, a feature that is a set of the plurality of Betti sequences generated with respect to each unit time. At this time, the learning apparatus 10 stores a model for clustering to extract a feature vector. The learning apparatus 10 inputs the extracted feature vectors for machine learning and constructs a learning model.

After learning is completed, the learning apparatus 10 performs for classification target data the same processing as the learning processing and extracts a feature vector. Specifically, the learning apparatus 10 sections classification target data into a plurality of sub-sections, generates an attractor for each sub-section, and computes Betti sequences in accordance with the generated attractors by performing TDA processing. The learning apparatus 10 extracts a feature vector from the Betti sequences by using the model for clustering that has been stored at the time of learning. Subsequently, the learning apparatus 10 inputs the feature vector of the classification target data to the trained learning model and classify the classification target data in accordance with the output result.

As described above, concerning the situation of classifying labeled data per unit time that covers a plurality of different features, the learning apparatus 10 is able to extract as a feature the distribution of features covered in a unit time, and thus, it is possible to improve the accuracy of data learning. While the embodiment 1 is illustrated in FIG. 1 by using an example in which the learning apparatus 10 performs learning processing and classification processing, the configuration is not limited to this example and the two kinds of processing may be performed separately by different apparatuses.

An example of a system in which the learning apparatus 10 of the embodiment 1 is applied will be described later with reference FIGS. 17 and 18.

[Functional Configuration]

Figure 2:
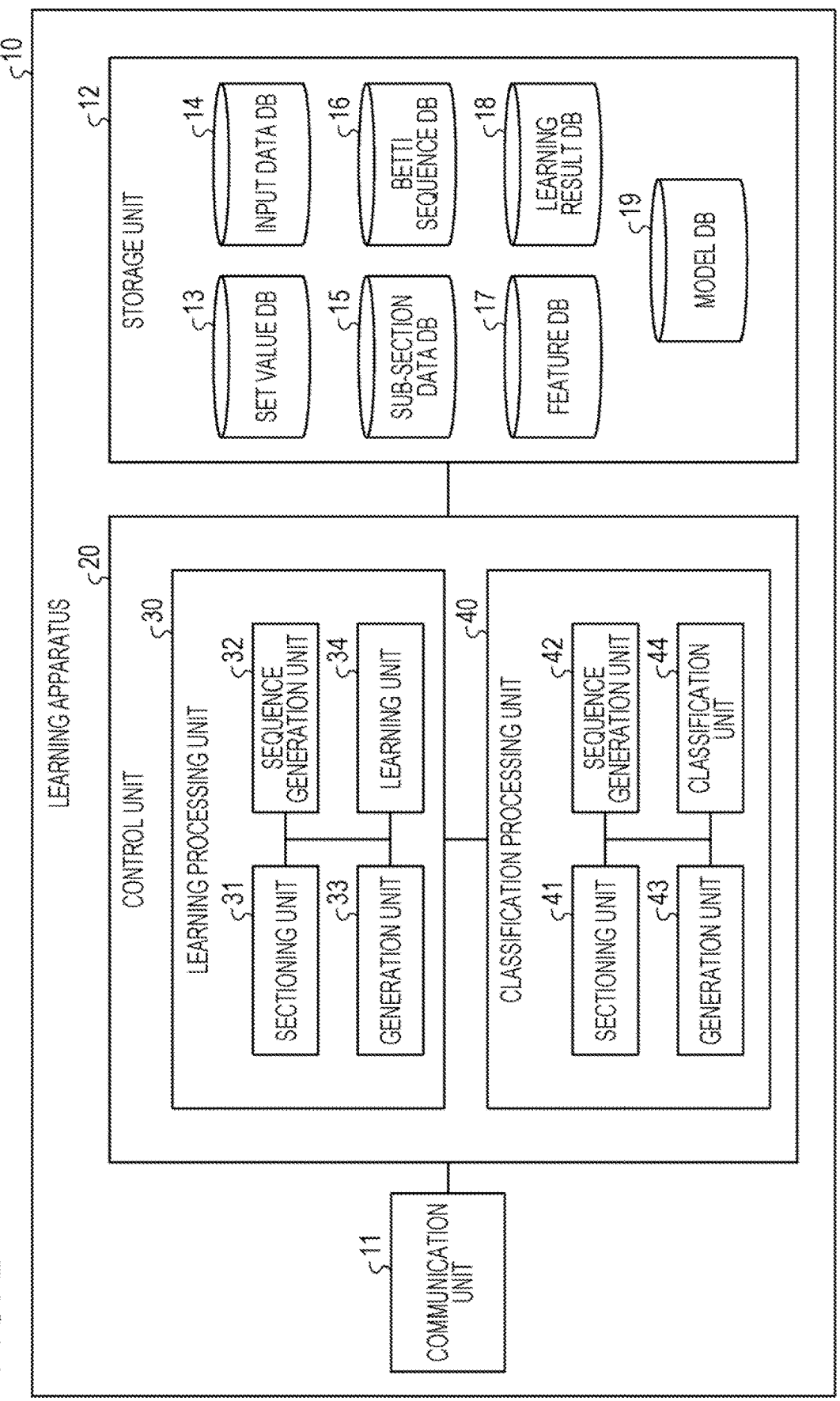
FIG. 2 is a functional block diagram illustrating a functional configuration of the learning apparatus according to the embodiment 1.

FIG. 2 is a functional block diagram illustrating a functional configuration of the learning apparatus 10 according to the embodiment 1. As illustrated in FIG. 2, the learning apparatus 10 includes a communication unit 11, a storage unit 12, and a control unit 20.

The communication unit 11 is a processing unit that controls communications with another device and implemented as, for example, a communication interface. For example, the communication unit 11 receives learning data, classification target data, or the like from a management apparatus and transmits a learning result, a classification result, or the like to the management apparatus.

The storage unit 12 is an example of a storage device that stores, for example, data and a program to be run by the control unit 20 and implemented as, for example, a memory or a hard disk. The storage unit 12 stores a set value database (DB) 13, an input data DB 14, a sub-section data DB 15, a Betti sequence DB 16, a feature DB 17, a learning result DB 18, and a model DB 19.

The set value DB 13 is a database that stores, for example, the number of sections that is used when input data is sectioned. The information stored in the set value DB 13 may be changed in settings in any manner.

Figures 3, 4:
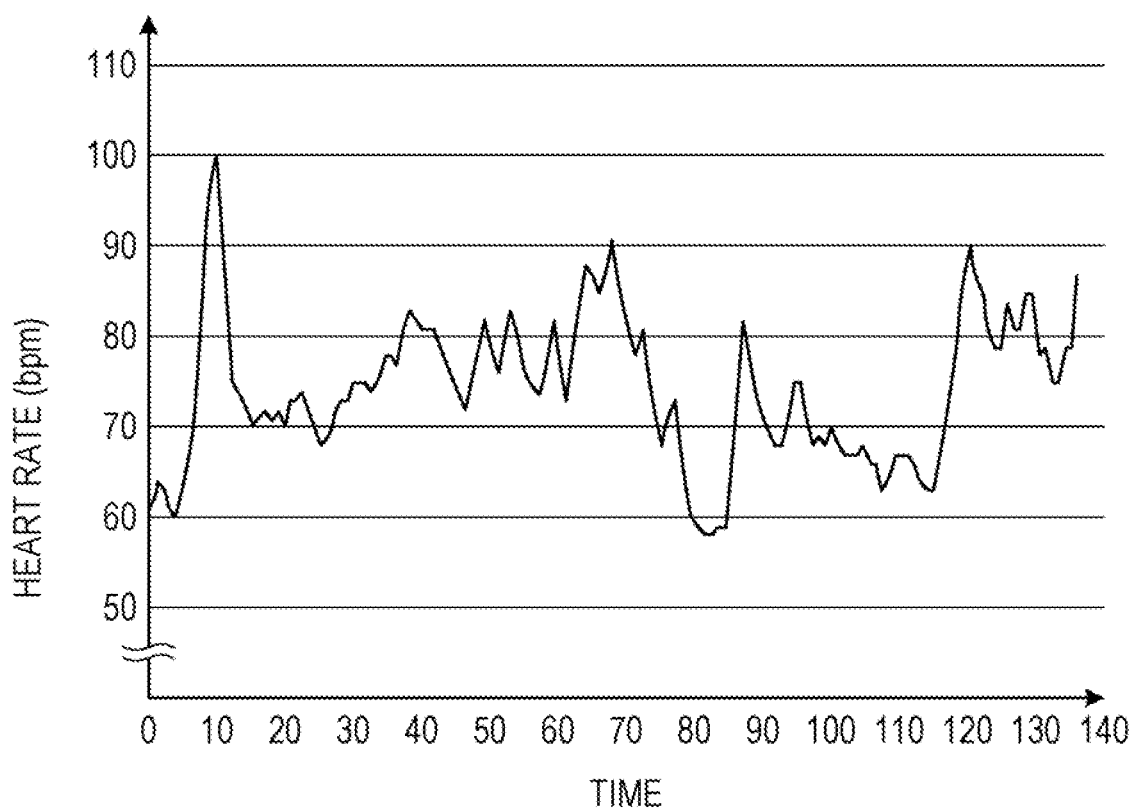
FIG. 3 illustrates an example of input data.
FIG. 4 illustrates an example of time series data.

The input data DB 14 is a database that stores input data to which a single label is attached, that is, learning data in which movement varies for a period corresponding to the single label. FIG. 3 illustrates an example of input data. As illustrated in FIG. 3, the input data DB 14 stores information about input data in which "a time, a label, and data" are associated with each other. "Time" stored in the information indicates a time at which corresponding data is obtained. "Label" is information that is attached to corresponding data and indicates a particular category as which the corresponding data is classified. "Data" indicates data targeted for learning. The example in FIG. 3 indicates that a label "label A" is attached to time series data per unit time serving as learning data obtained during a time "10:00-10:10".

This embodiment is described by using, as an example of learning data, time series data having a cyclic characteristic such as time series data indicating changes in heart rate. FIG. 4 illustrates an example of time series data. FIG. 4 is a graph representing time series data indicating changes in heart rate, in which the vertical axis indicates heart rate (beats per minute) and the horizontal axis indicates time.

While the time series data of heart rate is used as an instance of continuous data in this example, time series data is not limited to this kind of data. The time series data may be, for example, biometric data except for heart rate (time series data indicating brain waves, pulse, body temperature, or the like) or wearable sensor data (time series data obtained by a gyro sensor, an acceleration sensor, a geomagnetic sensor, or the like). The time series data may also be, for example, financial data (time series data indicating interest rates, commodity prices, balance of international payments, stock prices, or the like), natural environment data (time series data indicating temperature, humidity, carbon dioxide levels, or the like), or social data (labor statistics data, demographic statistics data, or the like).

The sub-section data DB 15 created by a learning processing unit 30 described later or the like is a database that stores sub-section data obtained by sectioning input data into sub-sections. FIG. 5 illustrates an example of sub-section data. As illustrated in FIG. 5, the sub-section data DB 15 stores information about sub-section data in which "a time, a label, a sub-section number, and data" are associated with each other.

"Time" stored in the information indicates a time at which corresponding input data to be sectioned is obtained. "Label" Indicates a label that is attached to corresponding input data to be sectioned. "Sub-section number" is an identifier that identifies a particular sub-section obtained by sectioning. "Data" indicates generated sub-section data. The example in FIG. 5 indicates that input data obtained during the time "10:00-10:10" is sectioned into a plurality of sub-sections of time series data.

The Betti sequence DB 16 is a database that stores Betti sequences generated by the control unit 20 and corresponding to individual items of sub-section data. FIG. 6 illustrates an example of Betti sequences for individual sub-sections. As illustrated in FIG. 6, the Betti sequence DB 16 stores information about a Betti sequence in which "a time, a label, a sub-section number, and data" are associated with each other.

"Time" stored in the information indicates a time at which input data from which a corresponding Betti sequence is generated is obtained. "Label" indicates a label that is attached to input data from which a corresponding Betti sequence is generated. "Sub-section number" is an identifier that identifies a particular sub-section obtained by sectioning. "Data" indicates a generated particular Betti sequence. The example in FIG. 6 indicates that Betti sequences are generated for the respective sub-sections of time series data corresponding to the time "10:00-10:10".

Figures 7, 8:
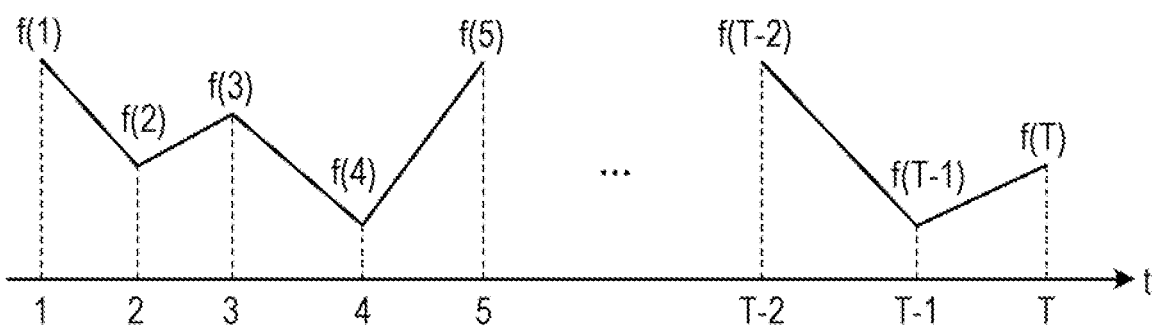
FIG. 7 illustrates an example of features of items of input data.
FIG. 8 illustrates an example of time series data targeted for learning.
Figure 9A:
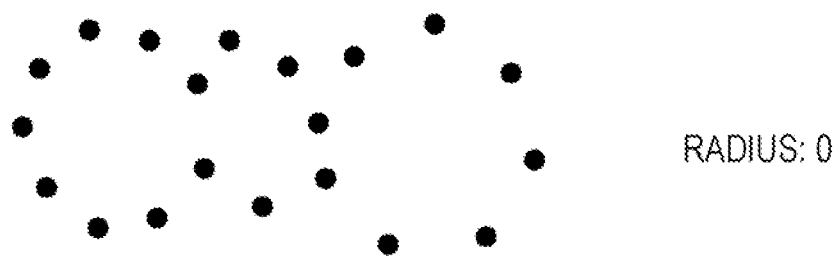
FIGS. 9A to 9D illustrate persistent homology.
Figure 9B:
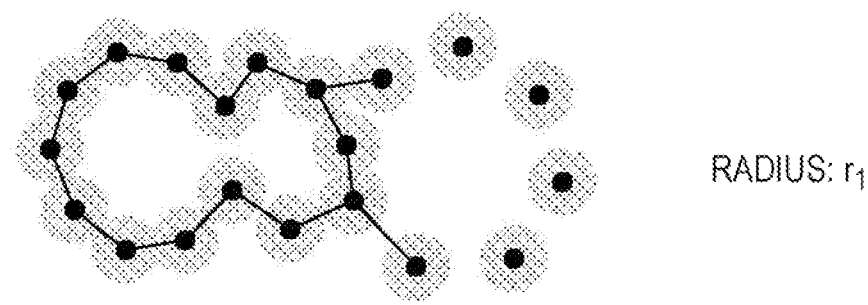
Figure 9C:
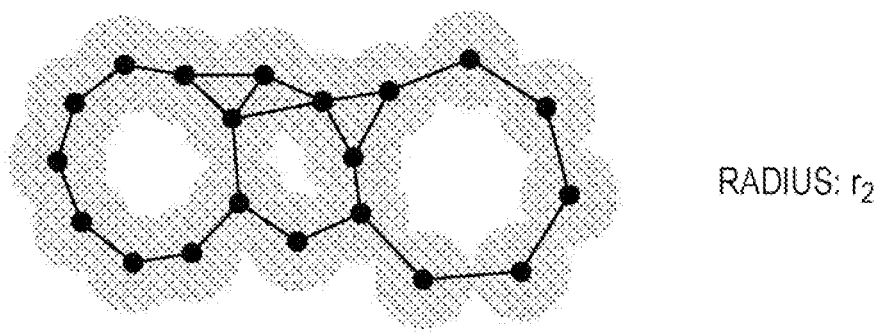
Figure 9D:
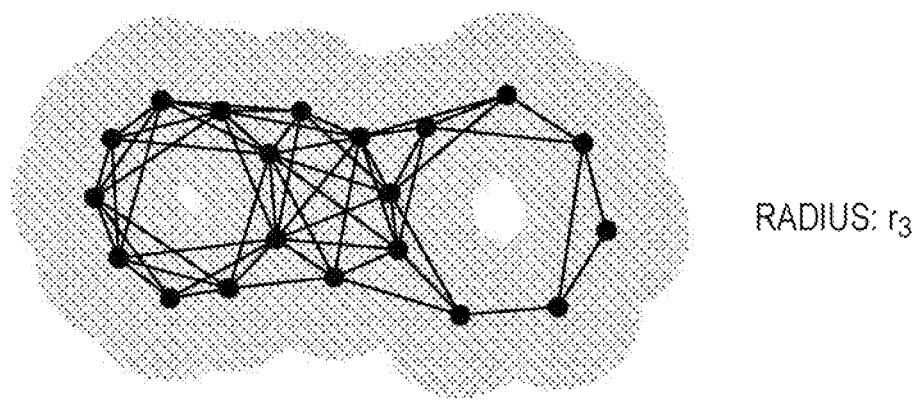

The feature DB 17 is a database that stores features to be input for machine learning. FIG. 7 illustrates an example of features of items of input data. As illustrated in FIG. 7, the feature DB 17 stores data about a feature in which "a time, a label, and data" are associated with each other.

"Time" stored in the information indicates a time at which input data from which a corresponding feature is generated is obtained. "Label" Indicates a label that is attached to input data from which a corresponding feature is generated. "Data" indicates a generated particular feature. The example in FIG. 7 indicates a feature "feature vector" is generated for input data that is obtained during the time "10:00-10:10" and to which "label A" is attached.

The learning result DB 18 is a database that stores learning results. For example, the learning result DB 18 stores specification results (classification results) about learning data that are obtained by the control unit 20 and various parameters that are learned by performing machine learning or deep learning.

The model DB 19 is a database that stores a model for clustering (hereinafter also referred to as a cluster model) that is used for extracting a feature from Betti sequences. For example, the model DB 19 stores parameters of a cluster model generated by the learning processing unit 30 described later.

The control unit 20 is a processing unit that controls entire processing of the learning apparatus 10 and implemented as, for example, a processor. The control unit 20 includes the learning processing unit 30 and a classification processing unit 40. The learning processing unit 30 and the classification processing unit 40 are an example of electronic circuits included in a processor or the like or processes that are executed by a processor or the like.

The learning processing unit 30 includes a sectioning unit 31, a sequence generation unit 32, a generation unit 33, and a learning unit 34 and is a processing unit that performs learning processing for constructing a learning model (a classification model) used for classifying time series data.

The sectioning unit 31 is a processing unit that sections input data. Specifically, the sectioning unit 31 sections time series data per unit time read from the input data DB 14 into a particular number of sub-sections, the particular number being stored in the set value DB 13, and accordingly generates sub-section data. The sectioning unit 31 stores data obtained by sectioning in the sub-section data DB 15.

For example, the sectioning unit 31 reads from the input data DB 14 "time series data per unit time" obtained during the time "10:00-10:10". The sectioning unit 31 sections "the time series data per unit time" into the number of sections "N" and generates N items of sub-section data. The sectioning unit 31 then assigns sub-section numbers "1, 2, ..., N" individually to the N items of sub-section data and stores the N items of sub-section data and the sub-section numbers in the sub-section data DB 15.

The sequence generation unit 32 is a processing unit that generates a Betti sequence for each item of sub-section data by performing TDA processing. For example, the sequence generation unit 32 obtains from the sub-section data DB 15 items of sub-section data corresponding to the time "10:00-10:10". The sequence generation unit 32 subsequently generates Betti sequences in accordance with the items of sub-section data that are obtained and stores in the Betti sequence DB 16 the Betti sequences in association with the time "10:00-10:10" and corresponding sub-section numbers.

The sequence generation unit 32 generates a plurality of quasi-attractors from targeted items of sub-section data, obtains Betti numbers by performing persistent homology conversion for the plurality of quasi-attractors, and consequently generates a plurality of Betti sequences from the Betti numbers. For example, the sequence generation unit 32 generates a Betti sequence by using a general method. One example is that the sequence generation unit 32 divides a radius range $[r_{min}, r_{max}]$ used for computing Betti numbers by m−1, computes a Betti number $B(r_i)$ with respect to each radius $r_i$ (i=1, . . . , m), and accordingly generates a Betti sequence in which the Betti numbers $[B(r_1), B(r_2), B(r_3), . . . , B(r_m)]$ are ordered.

Figure 10:
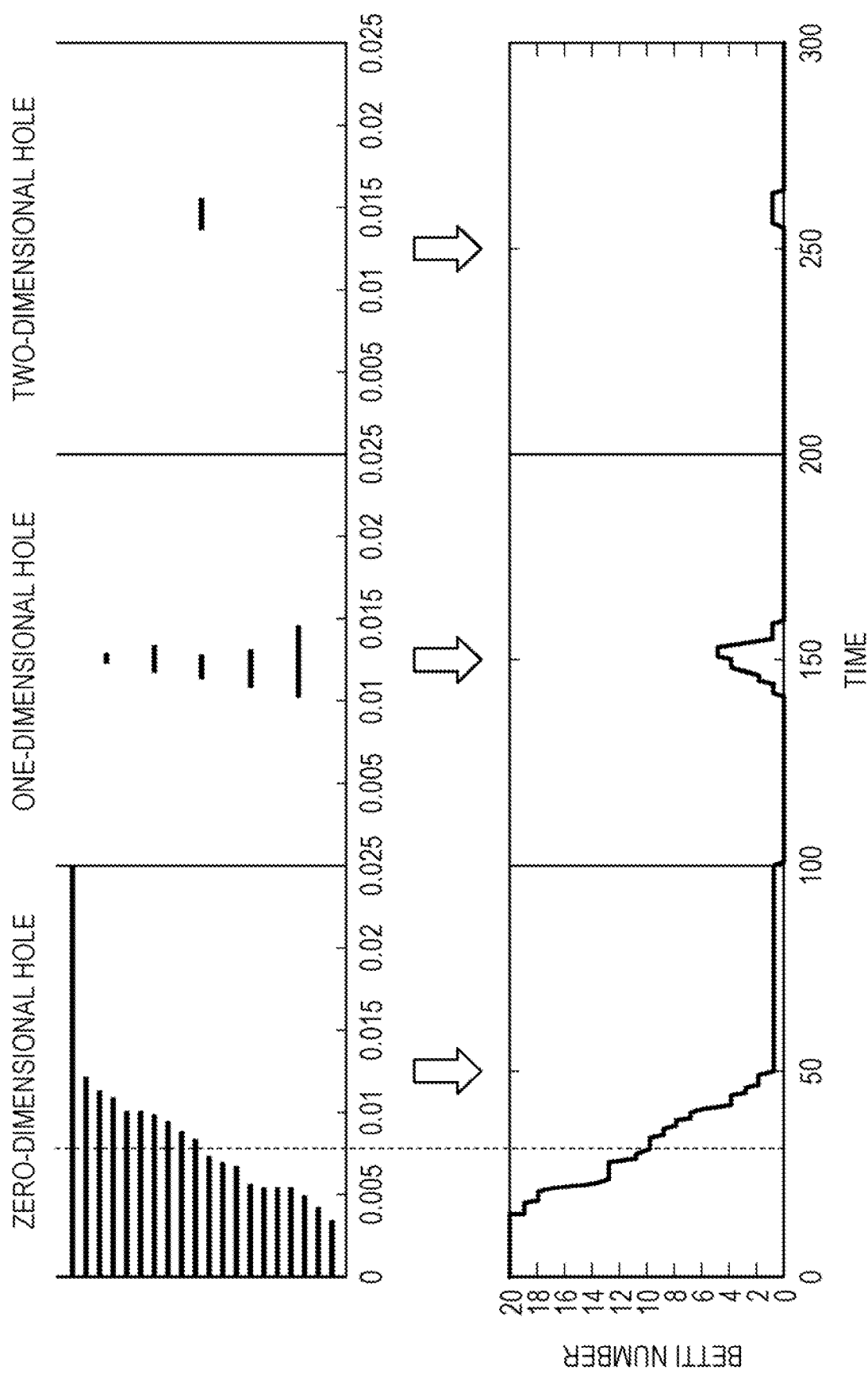
FIG. 10 illustrates correspondence between bar code data and generated continuous data.

FIG. 8 illustrates an example of time series data targeted for learning. FIGS. 9A to 9D illustrate persistent homology. FIG. 10 illustrates correspondence between bar code data and generated continuous data.

The generation of quasi-attractor is described with reference to FIG. 8. For example, the case of continuous data represented by a function f(t) (t denotes a time) as illustrated in FIG. 8 is considered as an example. It is assumed that actual values f(1), f(2), f(3), . . . , f(T) are given. The quasi-attractor in the present embodiment is a set of points in a N-dimensional space in which values of N points obtained from continuous data successively at delay time τ (τ≥1) intervals are used as components. Here, N is an embedding dimension and usually N=3 or 4. For example, when N=3 and T=1, a quasi-attractor containing (T−2) points is generated as follows.

Quasi-attractor={(f(1),f(2),f(3)),(f(2),f(3),f(4)),(f(3),f(4),f(5)), . . . ,(f(T−2),f(T−1),f(T))}

The sequence generation unit 32 generates a quasi-attractor and converts the quasi-attractor into a Betti sequence by performing persistent homology conversion. The attractor generated here is referred to as a "quasi-attractor" because the attractor is a finite set of points.

"Homology" is a method of expressing features of an object by using the numbers of holes in m (m≥0) dimensions. The "hole" mentioned here is an element of a homology group. A zero-dimensional hole is a coupled component, a one-dimensional hole is a hole (a tunnel), and a two-dimensional hole is a void. The number of holes in each dimension is referred to as a Betti number. "Persistent homology" Is a method for characterizing transitions of holes in m dimensions with respect to an object (a set of points (a point cloud) in this description) and enables defining features of the positions of points. In this method, each point in the object is gradually expanded to form a spherical shape, and during this process, the time at which a particular hole appears (the time is represented by the radius of the corresponding sphere at the time of appearance) and the time at which a particular hole disappears (the time is represented by the radius of the sphere at the time of disappearance) are specified.

The persistent homology is more specifically described with reference to FIGS. 9A to 9D. The rule is that, when two spheres abut each other, the centers of the two spheres are joined to each other by a line segment; when three spheres abut each other, the centers of the three spheres are joined to each other by a line segment. Here, only coupled components and holes are considered. In the case in FIG. 9A (radius r=0), only coupled components appear and no hole appears. In the case in FIG. 9B (radius r=$r_1$), a hole appears and the coupled components partially disappear. In the case in FIG. 9C (radius r=$r_2$), more holes appear and only one of the coupled components remains. In the case in FIG. 9D (radius r=$r_3$), the number of coupled components remains at one and one hole disappears.

In the computation process of persistent homology, the radius of appearance and the radius of disappearance of an element (a hole) of a homology group are computed. By using the radius of appearance and the radius of disappearance of a hole, barcodelike data is generated. An item of barcodelike data is generated for each dimension of a particular hole and the whole of barcodelike data is generated by combining the multiple items of barcodelike data corresponding to respective dimensions of holes. Continuous data represents correspondence between a radius (a time) of a sphere in persistent homology and a Betti number.

With reference to FIG. 10, correspondence between barcodelike data and generated continuous data is described. The upper graph is generated from barcodelike data, in which the horizontal axis represents the radius. The lower graph is generated from continuous data (also referred to as a Betti sequence), in which the vertical axis represents the Betti number and the horizontal axis represents time. Since the Betti number represents the number of holes as described above, for example, when the radius is a particular radius indicated by a dashed line in the upper graph, the number of holes that exist is ten, and thus, the Betti number indicated by the dashed line in the lower bottom is also ten. The Betti numbers are counted for each block. The lower graph is a graph of pseudo-time series data and values represented by the horizontal axis does not mean anything.

Referring back to FIG. 2, the generation unit 33 is a processing unit that generates, with respect to each item of time series data per unit time, a feature of a particular item of time series data per unit time by using Betti sequences generated from items of sub-section data corresponding to the particular item of time series data per unit time. For example, the generation unit 33 obtains from the Betti sequence DB 16 Betti sequences corresponding to the time "10:00-10:10". To specify dominant movements in time series data, the generation unit 33 generates features by using the obtained Betti sequences; in other words, the generation unit 33 generates information used for specifying the ratios of operation processes in time series data. Subsequently, the generation unit 33 stores in the feature DB 17 the feature in association with the time "10:00-10:10" and a label.

For example, since Betti sequences of the number identical to the number of sub-sections are generated for each label, the generation unit 33 extracts a feature that is a set of the Betti sequences and uses the feature as a feature vector. For example, the generation unit 33 performs, with respect to each label, clustering for Betti sequences, counts the number of Betti sequences for each duster, and consequently generates a feature vector in which the numbers of Betti sequences of respective dusters are ordered.

The generation unit 33 generates a cluster model for grouping features and stores in the model DB 19 various parameters or the like relating to the cluster model. The cluster model is used when grouping is performed. For example, the generation unit 33 performs unsupervised learning by using Betti sequences generated from items of sub-section data of items of time series data and trains a cluster model used for grouping Betti sequences into clusters. The generation unit 33 generates a feature vector from corresponding Betti sequences with respect to each item of time series data by using the trained cluster model. This denotes that the generation unit 33 generates a cluster model with which it is determined in grouping that a Betti sequence is associated with a particular duster. The method of generating a cluster model is a mere example and general clustering techniques may be used.

The learning unit 34 is a processing unit that constructs a learning model by performing learning processing using features. For example, the learning unit 34 obtains from the feature DB 17 feature vectors that are features of items of input data, inputs the obtained feature vectors for machine learning, and performs learning processing.

For example, the learning unit 34 performs learning to specify a phenomenon in time series data by extracting an anomaly candidate in time series data in accordance with feature vectors. Specifically, for example, the learning unit 34 classifies an item of time series data as a phenomenon A and another item of time series data as a phenomenon B or detects in time series data a portion in which an event different from others occurs. The learning unit 34 performs learning by employing DL or the like to enable classification of phenomena in accordance with features of time series data and stores the learning result in the learning result DB 18. The learning result may contain a classification result (that is, an output of DL) and various parameters for a neural network used when outputs are computed from inputs.

Various types of method such as unsupervised learning, supervised learning, and semi-supervised learning are used as the learning method. In the case of unsupervised learning, for example, a support vector machine (SVM) may be used. In the case of supervised learning, supervised learning may be performed by using as input data a label that is set to input data and a feature vector.

The classification processing unit 40 includes a sectioning unit 41, a sequence generation unit 42, a generation unit 43, and a classification unit 44 and is a processing unit that performs classification of classification target data by using a trained learning model. The sectioning unit 41, the sequence generation unit 42, and the generation unit 43 respectively perform for classification target data the same processing operations as those performed by the sectioning unit 31, the sequence generation unit 32, and the generation unit 33, and the detailed descriptions thereof are thus omitted. The generation unit 43 constructs a cluster model by reading various parameters stored in the model DB 19, inputs Betti sequences generated by the sequence generation unit 42 to the cluster model, and extracts as a feature vector the result that is output by the cluster model.

The classification unit 44 is a processing unit that classifies classification target data by inputting to a trained learning model a feature (a feature vector) corresponding to the classification target data. For example, the classification unit 44 reads parameters or the like of the learning result from the learning result DB 18 and constructs a trained learning model. The classification unit 44 then inputs to the trained learning model a feature vector of classification target data generated by the sectioning unit 41, the sequence generation unit 42, the generation unit 43, or the like.

The classification unit 44 subsequently specifies classification target data in accordance with the output result of the trained learning model. For example, when the output result belongs to the phenomenon A between the phenomenon A and the phenomenon B, the classification unit 44 classifies classification target data as the phenomenon A; when the rate of the phenomenon A at which the phenomenon A is obtained as an output result is higher than the rate of the phenomenon B, the classification unit 44 classifies classification target data as the phenomenon A. For example, the classification unit 44 displays the classification results on a display unit such as a display device and transmits the classification result to a management apparatus.

Specific Example

Figure 11:
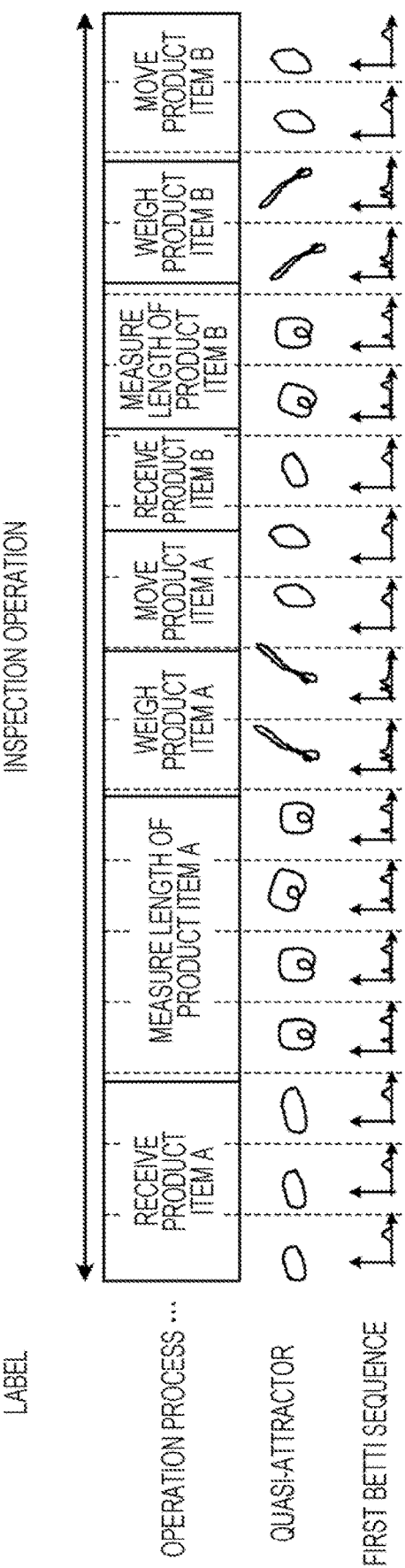
FIG. 11 illustrates sectioning and generation of quasi-attractor.
Figure 12:
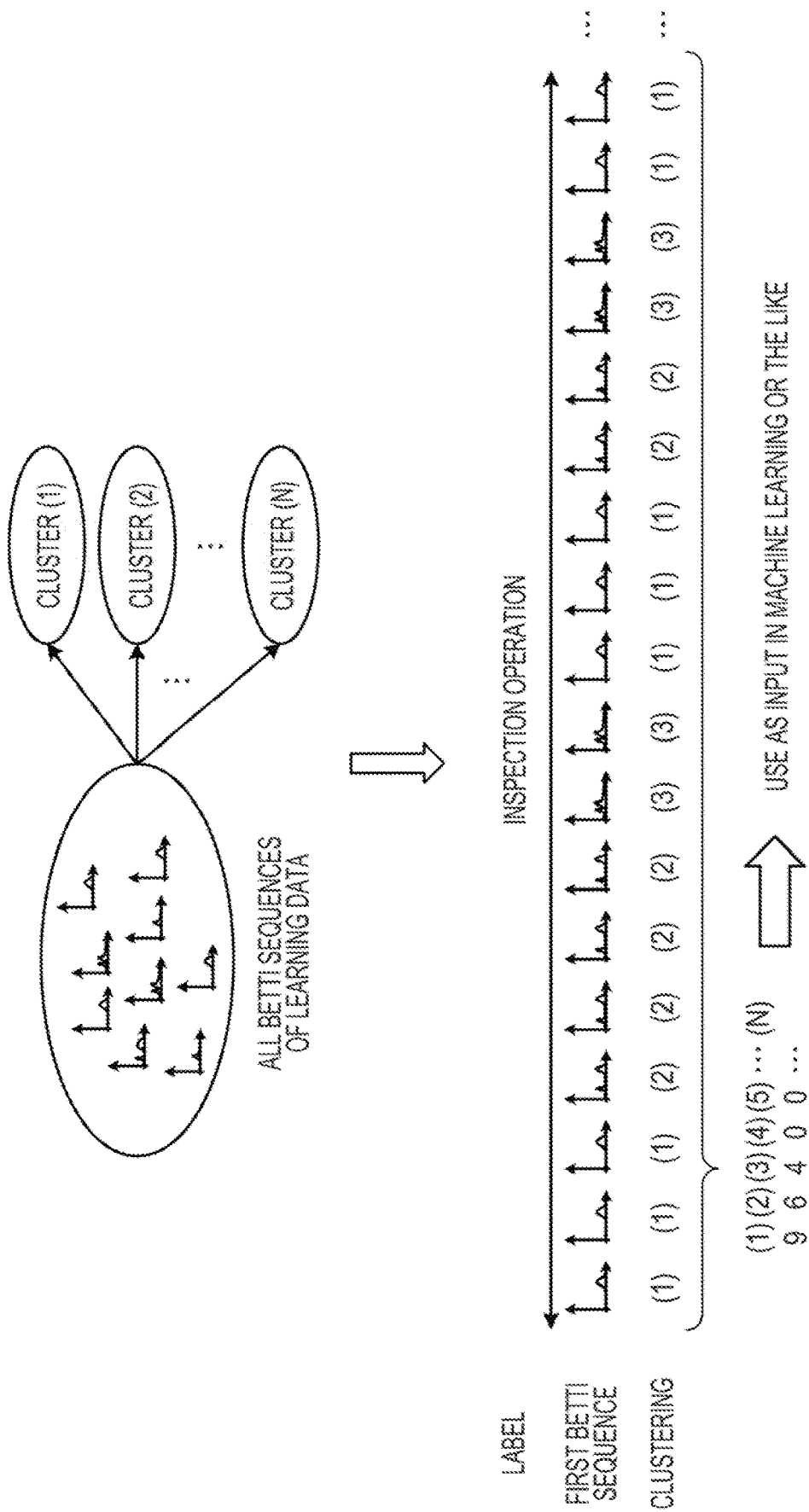
FIG. 12 illustrates extraction of features.
Figure 13:
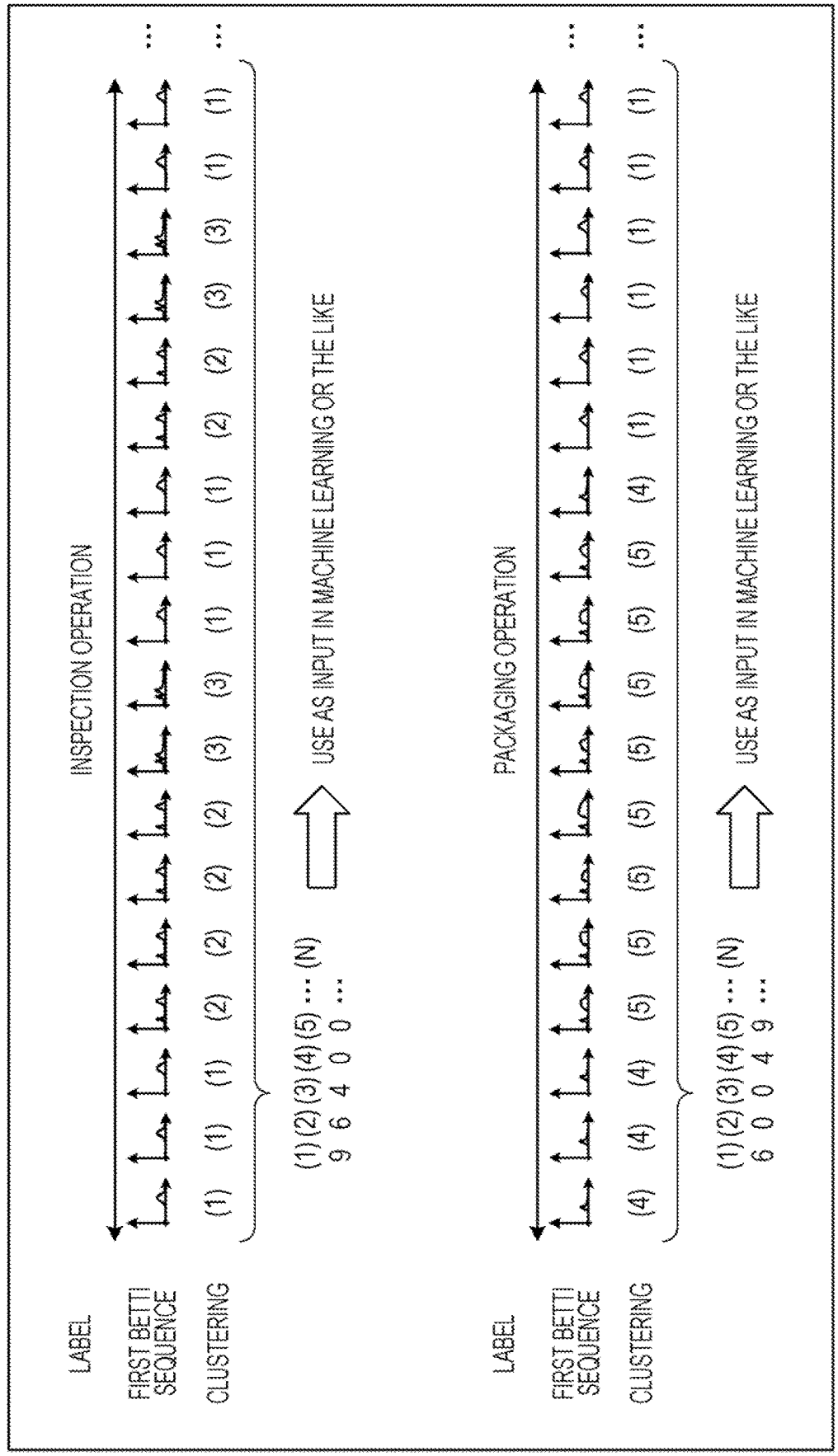
FIG. 13 illustrates an example of learning.
Figure 14:
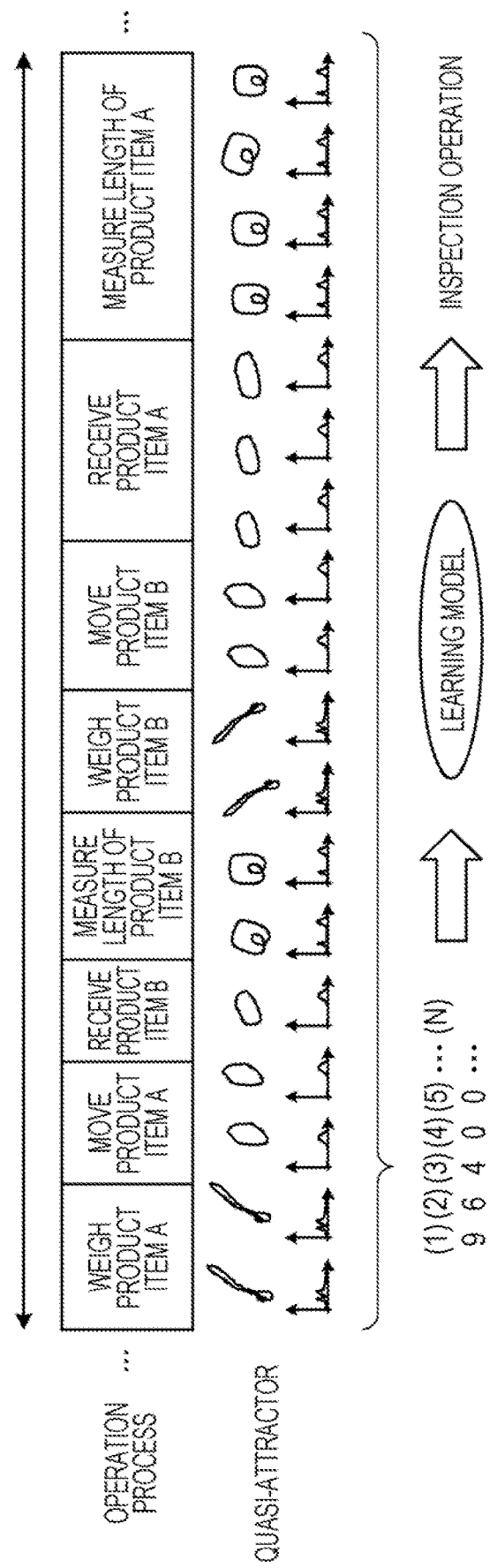
FIG. 14 illustrates an example of classification after learning.

Next, a specific example is described with reference to FIGS. 11 to 14. FIG. 11 illustrates sectioning and generation of quasi-attractor. FIG. 12 illustrates extraction of features. FIG. 13 illustrates an example of learning. FIG. 14 illustrates an example of classification after learning. The description here uses an example of computing first Betti sequences.

In the specific example, time series data per unit time associated with the label "inspection operation" is used and the time series data contains as operation processes "receive product item A", "measure the length of product item A", "weigh product item A", "move product item A", "receive product item B", "measure the length of product item B", "weigh product item B", and "move product item B".

Firstly, as illustrated in FIG. 11, the learning processing unit 30 generates items of sub-section data by sectioning into the preset number of sections time series data per unit time to which the label "inspection operation" Is attached. The learning processing unit 30 then generates quasi-attractors from the items of sub-section data and accordingly generates first Betti sequences of the items of sub-section data.

Next, as illustrated in FIG. 12, the learning processing unit 30 performs clustering for all the first Betti sequences of the sub-sections of learning data by using a known clustering method. For example, the learning processing unit 30 performs clustering of N clusters of cluster (1) to cluster (N) and counts, with respect to each duster, the number of Betti sequences that belongs to a particular cluster. In the example in FIG. 12, the learning processing unit 30 determines in counting, for example, "9" as the number of Betti sequences belonging to cluster (1), "6" as the number of Betti sequences belonging to cluster (2), "4" as the number of Betti sequences belonging to cluster (3), and "0" as the number of Betti sequences belonging to cluster (4).

The learning processing unit 30 then inputs for machine learning the count results of respective cluster as a feature vector and performs learning processing. In the example in FIG. 12, the learning processing unit 30 generates a feature vector "9, 6, 4, 0, 0, . . . " by using, for example, "9" as the number of Betti sequences belonging to cluster (1), "6" as the number of Betti sequences belonging to cluster (2), "4" as the number of Betti sequences belonging to cluster (3), and "0" as the number of Betti sequences belonging to cluster (4). The learning processing unit 30 performs machine learning by using the feature vector "9, 6, 4, 0, 0, . . . " as a feature of time series data of the label "inspection operation" illustrated in FIG. 11.

As described above, the learning processing unit 30 performs sectioning, generating Betti sequences, clustering, and the like and consequently generates a feature vector of time series data per unit time. As illustrated in FIG. 13, the learning processing unit 30 generates the feature vector "9, 6, 4, 0, 0, . . . " for time series data per unit time to which the label "Inspection operation" is attached and performs machine learning by using the feature vector as an input. The learning processing unit 30 also generates a feature vector "6, 0, 0, 4, 9, . . . " for time series data per unit time to which a label "packaging operation" is attached and performs machine learning by using the feature vector as an input.

After learning is completed, the classification processing unit 40 performs classification processing by using a trained learning model. For example, as illustrated in FIG. 14, the classification processing unit 40 performs for classification target data sectioning, generating Betti sequences, clustering, or the like similarly to the learning processing unit 30 and generates a feature vector "9, 6, 4, 0, 0, . . . " that corresponds to classification target data. The classification processing unit 40 inputs the generated feature vector "9, 6, 4, 0, 0, . . . " to the trained learning model and obtains an output result. The classification processing unit 40 subsequently classifies the classification target data as, for example, "inspection operation" in accordance with the output result.

[Processing Flow]

Figure 15:
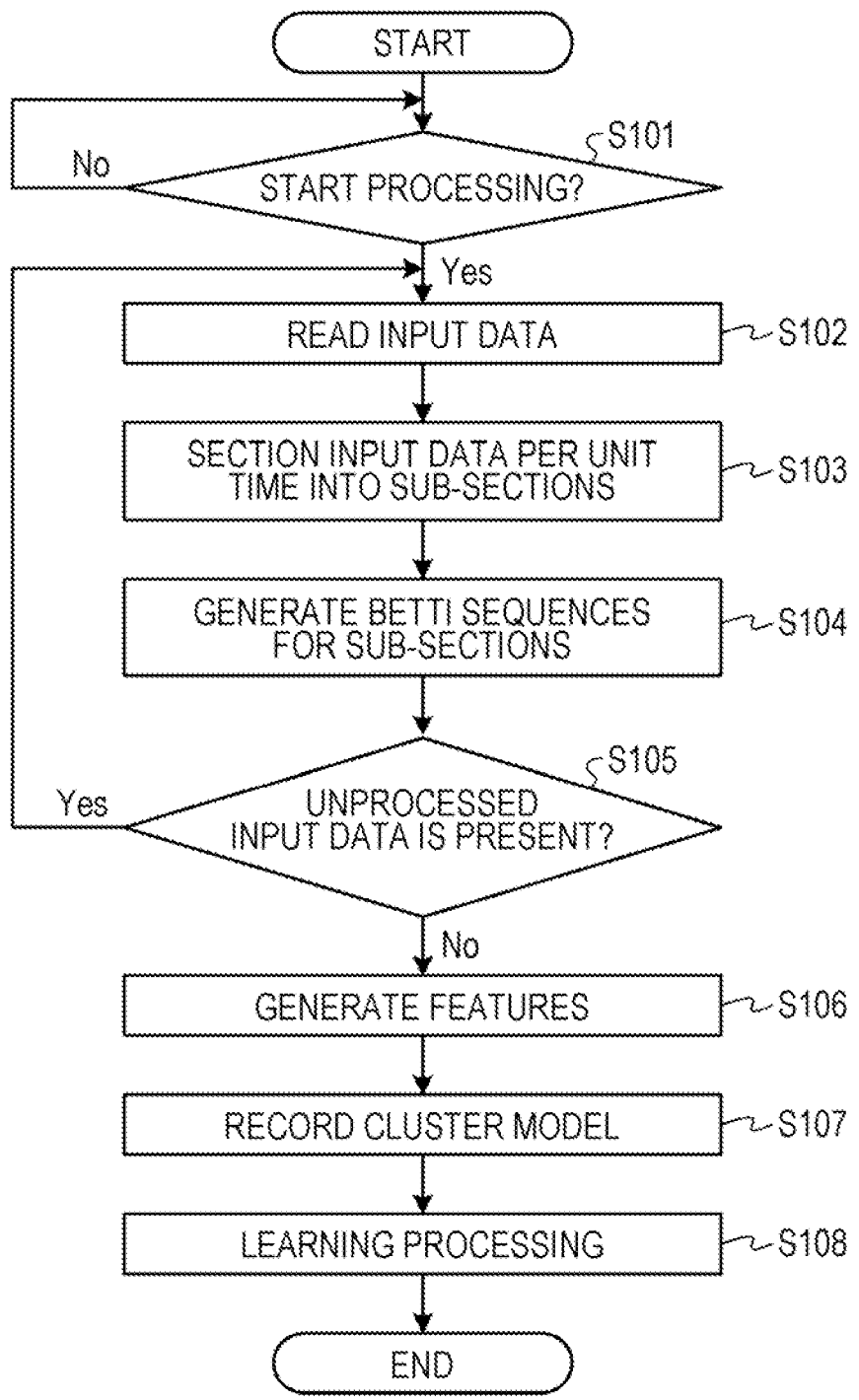
FIG. 15 is a flowchart illustrating a flow of learning processing.

FIG. 15 is a flowchart illustrating a flow of the learning processing. The classification processing after learning is performed following the same flow as that of the learning processing and the detailed description thereof is thus omitted.

As illustrated in FIG. 15, the learning processing unit 30 is notified of the starting time of processing (Yes in S101) and then reads input data from the input data DB 14 (S102).

The learning processing unit 30 subsequently sections into sub-sections input data per unit time that has been read (S103) and generates Betti sequences of the items of sub-section data (S104). The learning processing unit 30 determines whether unprocessed input data is present (S105).

When unprocessed input data is present (Yes in S105), the learning processing unit 30 performs again the processing operations in S102 and the subsequent steps. When no unprocessed input data is present (No in S105), the learning processing unit 30 generates a feature of the input data from the Betti sequences of the items of sub-section data (S106).

Subsequently, the learning processing unit 30 generates a cluster model that is a feature generation model used for generating a feature from Betti sequences and stores information regarding the cluster model in the model DB 19 (S107). The learning processing unit 30 then performs learning processing by using features of items of input data (S108).

Effects

As described above, concerning the situation of classifying labeled data per unit time that covers a plurality of different features, the learning apparatus 10 is able to use the distribution of features covered in a unit time as a feature. As a result, the learning apparatus 10 is able to extract a feature that is not extracted by using data as it is, and thus, it is possible to broaden the application range of data analysis using TDA. Furthermore, using the learning apparatus 10 does not require meticulous labeling by an expert, and thus, it is possible to accomplish both the improvement of data classification speed and the improvement of classification accuracy.

Embodiment 2

While an embodiment of the present disclosure has been described, the present disclosure may be implemented in various different forms other than the embodiment described above.

[Computation of Feature]

For example, while the embodiment 1 describes the example of extracting a feature by performing clustering for Betti sequences of sub-section data, the configuration is not limited to this example. For example, the learning apparatus 10 may use a statistical quantity of features of individual sub-sections as a feature. With this configuration, it is possible to quantify the degree of variations of features and the tendency of outline feature excluding random variations of feature in a unit time.

Figure 16:
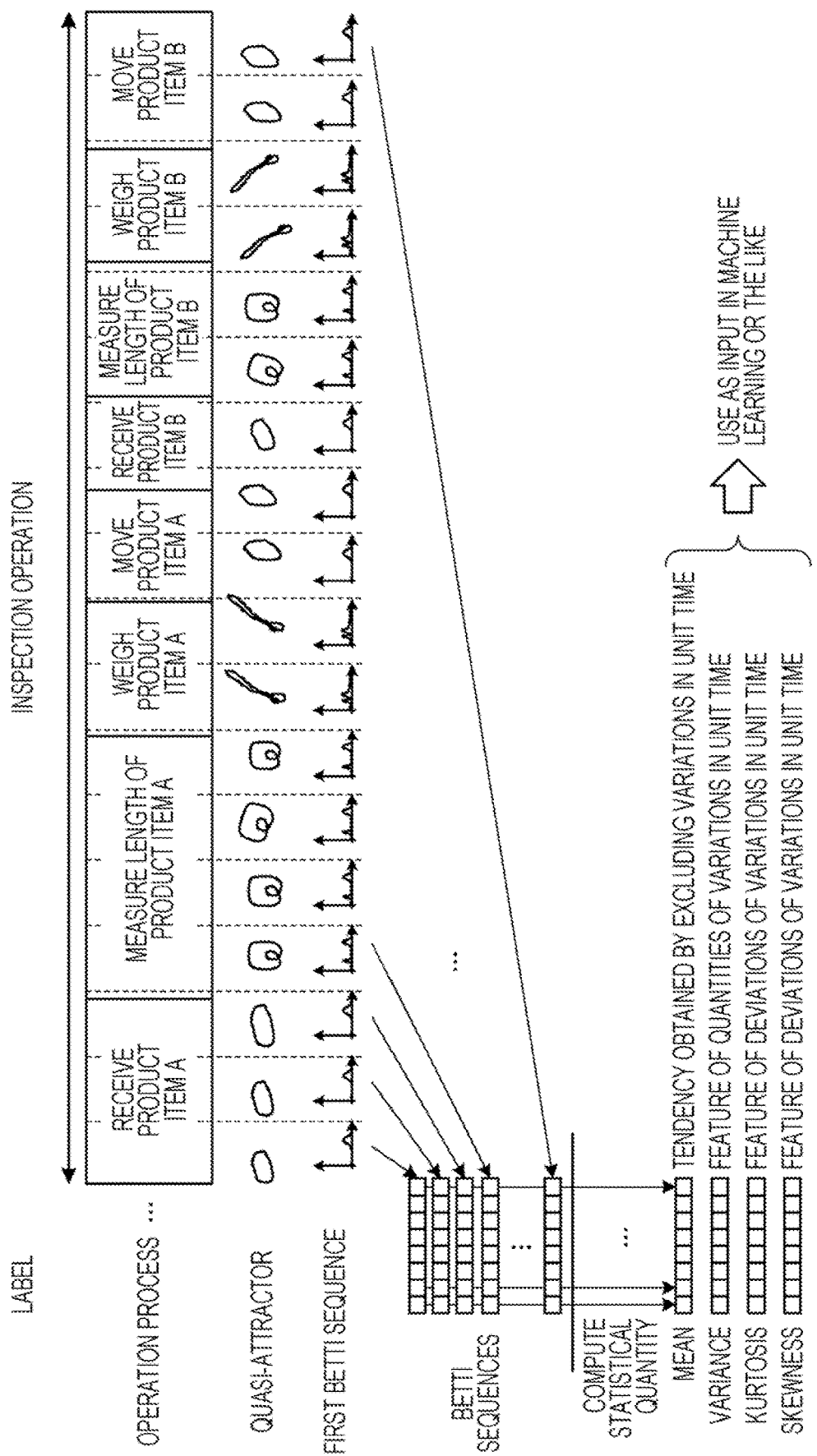
FIG. 16 illustrates another example of extraction of features.

FIG. 16 illustrates another example of extraction of features. As illustrated in FIG. 16, the learning apparatus 10 generates items of sub-section data by sectioning into the preset number of sections time series data per unit time to which the label "inspection operation" is attached. The learning processing unit 30 then generates quasi-attractors from the items of sub-section data and accordingly generates first Betti sequences of the items of sub-section data.

The learning apparatus 10 may then compute a statistical quantity of Betti sequences of items of sub-section data and use the statistical quantity as a feature of time series data per unit time to which the label "inspection operation" is attached. As the feature, mean, variance, kurtosis, skewness, and the like may be used.

Application Example

Figure 17:
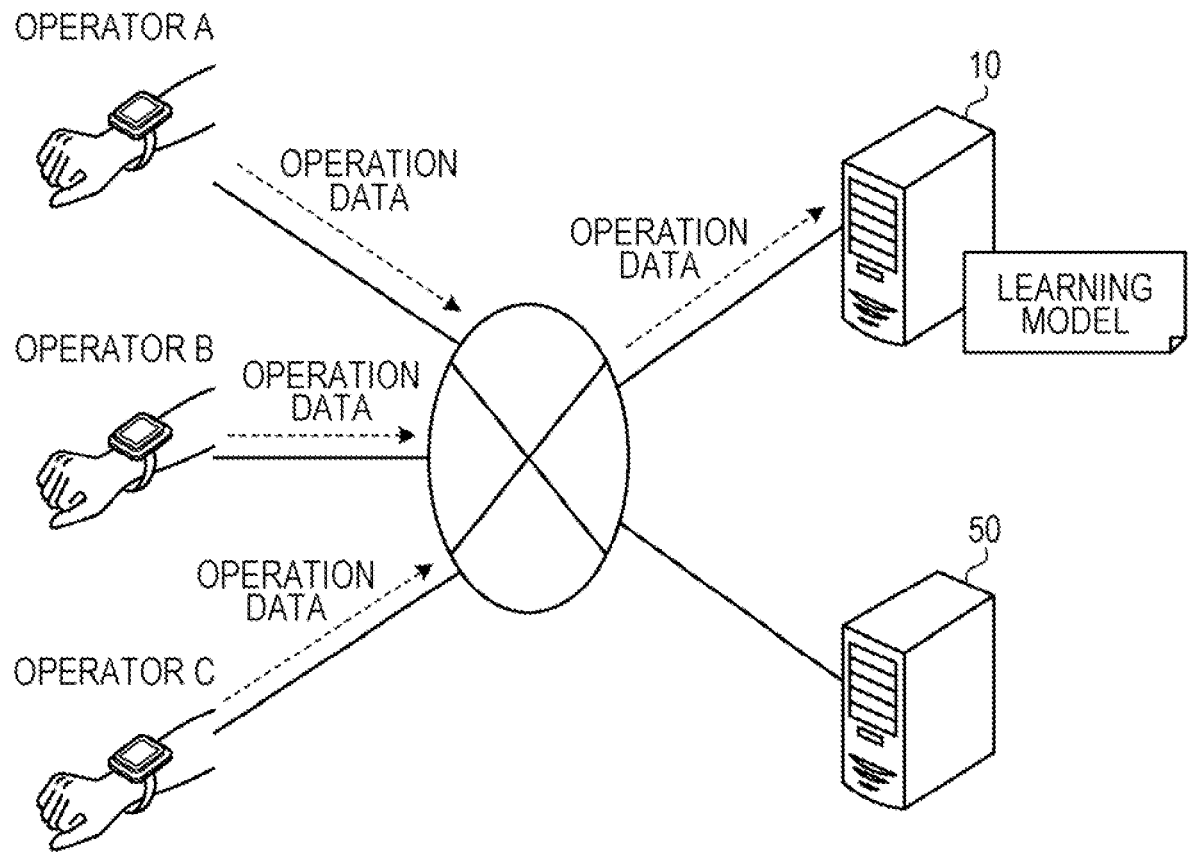
FIG. 17 illustrates an application example (learning phase) of a system.

With reference to FIGS. 17 and 18, an example of a system in which the learning apparatus 10 described in the embodiment 1 is applied. FIG. 17 illustrates an application example (learning phase) of a system. FIG. 18 illustrates another application example (actual use phase) of the system. This system automatically generates a daily operation report about, for example, the operation in a warehouse based upon data gathered through wearable sensors of operators. The description here uses an example of the system in which the learning apparatus 10 including the learning processing unit 30 and a classification apparatus 50 including the classification processing unit 40 are used.

As illustrated in FIG. 17, the learning apparatus 10 collects learning data from wearable sensors such as gyro sensors that are worn by operators (operators A to C) through wireless communications. An administrator or the like successively sets a label (an operation process label) identifying a particular operation process to the learning data with respect to every 10-minute period.

The learning apparatus 10 sections the collected data into sub-sections corresponding to 5-second periods, draws quasi-attractors for respective sub-sections, and computes Betti sequences. The learning apparatus 10 performs clustering for all the Betti sequences and generates a model C for clustering. The learning apparatus 10 determines the numbers of Betti sequences belonging to respective dusters as a feature vector in accordance with 120 Betti sequences generated per 10-minute period (label unit). The learning apparatus 10 computes feature vectors described above for the entire data, performs learning by using an SVM, and accordingly generates a classification model (a model S) used for classifying operation processes.

After learning is completed, as illustrated in FIG. 18, the classification apparatus 50 collects data from the wearable sensor worn by the operator A through wireless communications. The classification apparatus 50 sections the collected data per 10-minute period into 5-second periods. The classification apparatus 50 subsequently draws quasi-attractors for the respective sub-sections obtained by sectioning and computes Betti sequences.

The classification apparatus 50 then computes the numbers of Betti sequences belonging to respective dusters with respect to every 10-minute period of the collected data by using the model C and accordingly generates feature vectors. The classification apparatus 50 inputs the feature vectors to the model S and classifies operation processes. For example, the classification apparatus 50 is able to determine that the operator A has performed inspection operation from 9:00 to 12:00 and packaging operation from 13:00 to 17:00.

As described above, the classification apparatus 50 automatically classifies operation processes about an operator with respect to 10-minute periods on a designated date and automatically generates a daily operation report in which the classification result is presented. This enables operators to omit laborious work of writing a daily operation report while recalling operations on the day and it is possible to create an accurate daily operation report in a short time.

[Numerical Values or the Like]

The numerical values, details of label setting, various kinds of set values, the number of dimensions relating to quasi-attractors used in the embodiments are mere examples and may be changed in any manner. The input data and the learning method are also mere examples and may be changed in any manner. The feature vector is an example of feature and other information may be used when the information indicates the feature of a Betti sequence.

[System]

Processing procedures, control procedures, specific names, and information containing various kinds of data and parameters indicated in the specification and the drawings may be changed in any manner unless otherwise specified.

The constituent elements of the devices illustrated in the drawings are functional conceptual ones and not necessarily configured physically as illustrated in the drawings. Specific forms of distribution and integration of the devices are not limited to those illustrated in the drawings. All or some of the devices may be functionally or physically distributed or integrated in any unit based on various loads, usage statuses, or the like. For example, the learning processing and the classification processing may be performed by different apparatuses.

All or some of the processing functions performed by the devices may be implemented by a central processing unit (CPU) and a program analyzed and run by the CPU or may be implemented by a hardware device using wired logic coupling.

[Hardware]

Figure 19:
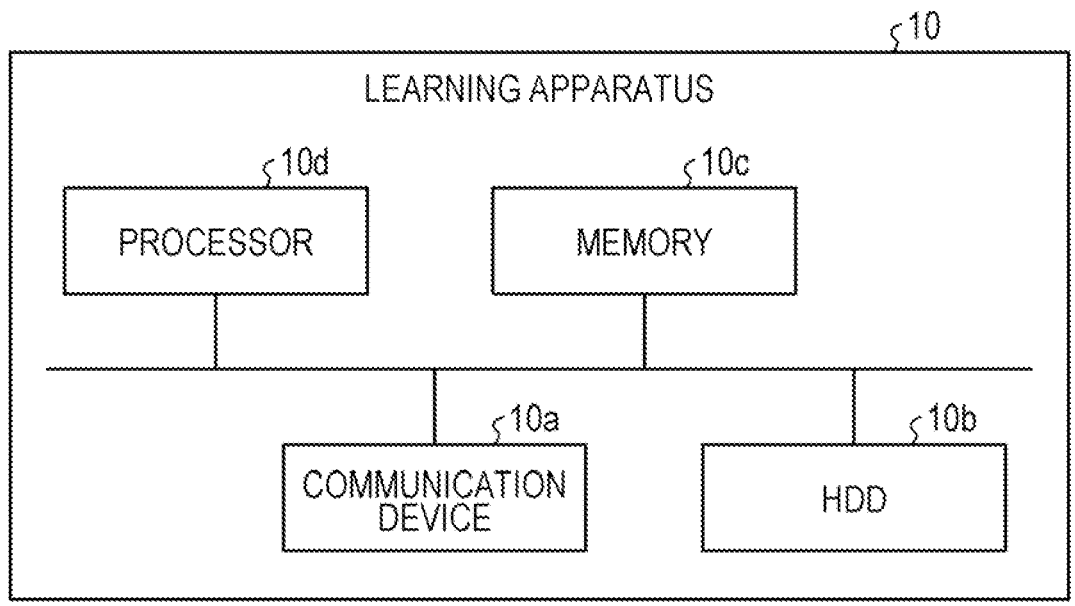
FIG. 19 illustrates an example of a hardware configuration.

FIG. 19 illustrates an example of a hardware configuration. As illustrated in FIG. 19, the learning apparatus 10 includes a communication device 10a, a hard disk drive (HDD) 10b, a memory 10c, and a processor 10d. The components illustrated in FIG. 19 are coupled to each other by, for example, a bus.

The communication device 10a is, for example, a network interface card and communicates with a server. The HDD 10b stores a program and DBs that implement functions illustrated in FIG. 2.

The processor 10d executes processes that implement the functions illustrated in, for example, FIG. 2 by reading from the HDD 10b or the like the program that implements processing operations identical to those of the processing units illustrated in FIG. 2 and loading the program into the memory 10c. The processes implement the same functions as that of the processing units included in the learning apparatus 10. Specifically, the processor 10d reads the program that implement the same functions as those of the learning processing unit 30, the classification processing unit 40, and the like from, for example, the HDD 10b. The processor 10d executes the processes that perform the same processing operations as that of the learning processing unit 30, the classification processing unit 40, and the like.

As described above, the learning apparatus 10 functions as an information processing apparatus that implements a learning method by reading and running the program. The learning apparatus 10 may also implement the same functions as those of the embodiments described above by reading the program from a recording medium with the use of a medium reading device and running the read program. The program described in other embodiments is not limited to a program that is run by the learning apparatus 10. For example, the disclosure is applicable to the case in which another computer or a server runs the program or the case in which the other computer and the server cooperate to run the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A learning method executed by a computer, the learning method comprising:
    performing a feature extraction process including:
        obtaining time series data to which a label indicating a category of classification is attached, the time series data containing variations of target values during a period to which the label is attached,
        dividing the time series data into a plurality of sections, and generating an attractor for each of the plurality of sections, the attractor indicating a set of numerical values toward which the variations of the target values tends to evolve,
        calculating a Betti sequence indicating a sequence of Betti numbers in accordance with the generated attractor for each of the plurality of sections, and
        obtaining a feature for the Betti sequences of the plurality of sections by clustering the Betti sequences or calculating a statistical quantity of the Betti sequences; and
    performing machine learning by using the obtained feature as an input.

2. The learning method of claim 1, wherein
    a feature vector is generated as the feature by using a number of sections belonging to each cluster used in the clustering the Betti sequences, and the machine learning is performed by using the feature vector as an input.

3. The learning method of claim 1, wherein
    at least one of mean, variance, kurtosis, and skewness is calculated as the statistical quantity of the Betti sequences, and the machine learning is performed by using the calculated statistical quantity as an input.

4. The learning method of claim 1, wherein:
    the time series data contains the variation of the target values obtained from a wearable sensor worn by an operator;
    the feature extraction process is performed for each of unit times to obtain features for the respective unit times; and
    the performing the machine learning includes training a classification model for classifying operation processes of the operator by using the obtained features.

5. The learning method of claim 4, further comprising:
obtaining classification results by inputting the obtained features to the trained classification model; and
generating a daily operation report of the operator in accordance with the obtained classification results.

6. A non-transitory, computer-readable recording medium having stored therein a program for causing a computer to execute a process, the process comprising:
obtaining time series data to which a label indicating a category of classification is attached, the time series data containing variations of target values during a period to which the label is attached;
sectioning the time series data into a plurality of sections, and generating an attractor for each of the plurality of sections, the attractor indicating a set of numerical values toward which the variations of the target values tends to evolve;
calculating a Betti sequence indicating a sequence of Betti numbers in accordance with the generated attractor for each of the plurality of sections;
obtaining a feature for the Betti sequences of the plurality of sections by clustering the Betti sequences or by calculating a statistical quantity of the Betti sequences; and
performing machine learning by using the obtained feature as an input.

7. An apparatus comprising:
a memory; and
a processor coupled to the memory and configured to:
obtain time series data to which a label indicating a category of classification is attached, the time series data containing variations of target values during a period to which the label is attached,
divide the time series data into a plurality of sections, and generate an attractor for each of the plurality of sections, the attractor indicating a set of numerical values toward which the variations of the target values tends to evolve,
calculate a Betti sequence indicating a sequence of Betti numbers in accordance with the generated attractor for each of the plurality of sections,
obtain a feature for the Betti sequences of the plurality of sections by clustering the Betti sequences or by calculating a statistical quantity of the Betti sequences, and
perform machine learning by using the obtained feature as an input.

* * * * *